United States Patent [19]

Bowen

[11] 4,063,544
[45] Dec. 20, 1977

[54] SOLAR ENERGY COLLECTORS

[75] Inventor: Robert F. Bowen, Burlington, Mass.

[73] Assignee: Raytheon Company, Lexington, Mass.

[21] Appl. No.: 729,737

[22] Filed: Oct. 5, 1976

[51] Int. Cl.$^2$ ............................................. F24J 3/02
[52] U.S. Cl. ................................. 126/270; 126/271; 220/62
[58] Field of Search ............... 126/270, 271; 237/1 A; 220/62, 70, 72, 74

[56]  References Cited

U.S. PATENT DOCUMENTS

| 1,361,350 | 12/1920 | Schnepel | 220/62 |
| 1,404,154 | 1/1922 | Lee | 220/62 |
| 3,023,753 | 3/1962 | Wheless | 126/270 |
| 3,102,532 | 9/1963 | Shoemaker | 126/270 |
| 3,559,691 | 2/1971 | Neumann | 220/62 |
| 4,003,363 | 1/1977 | Grossman | 126/271 |
| 4,011,856 | 3/1977 | Gallagher | 126/271 |

FOREIGN PATENT DOCUMENTS 938,012  9/1963  United Kingdom ................. 126/271

Primary Examiner—Kenneth W. Sprague
Assistant Examiner—James C. Yeung
Attorney, Agent, or Firm—Harold A. Murphy; Joseph D. Pannone; John T. Meaney

[57] ABSTRACT

A solar energy collector which includes an enclosure within which is located a solar energy-absorbing panel disposed in spaced relation with an overlying glazing, the enclosure being a single sheet of metal fabricated with integral side and end walls, spacing ribs, glaze-holding lips, lock joints and tie down brackets.

3 Claims, 7 Drawing Figures

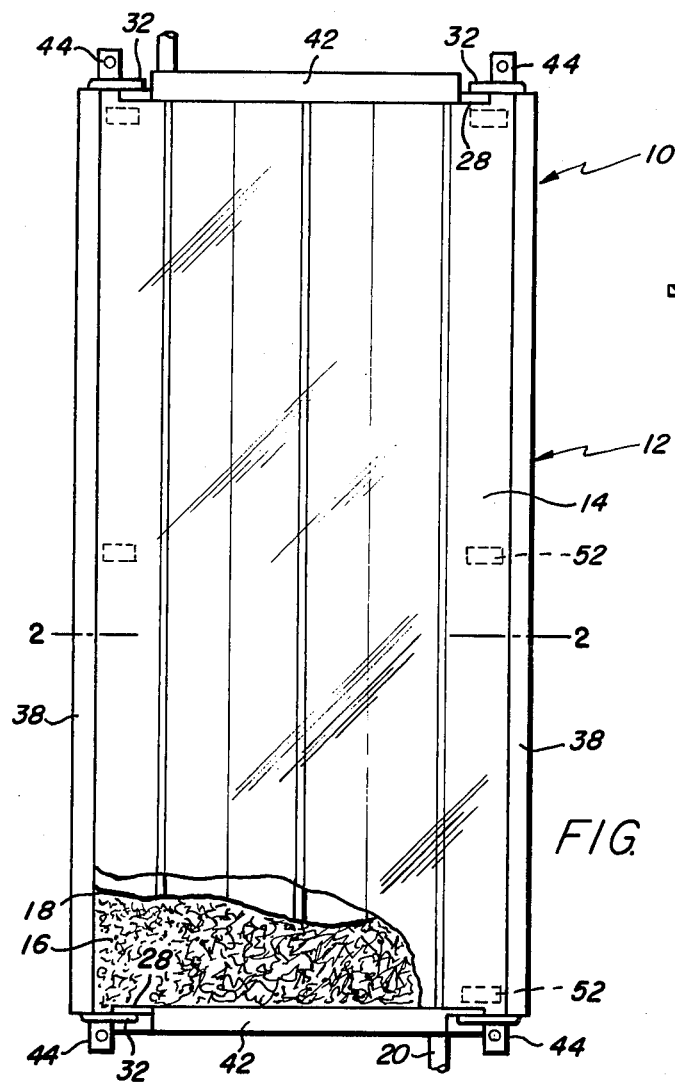
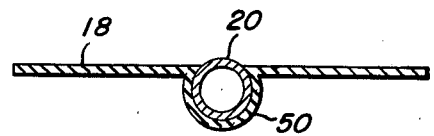
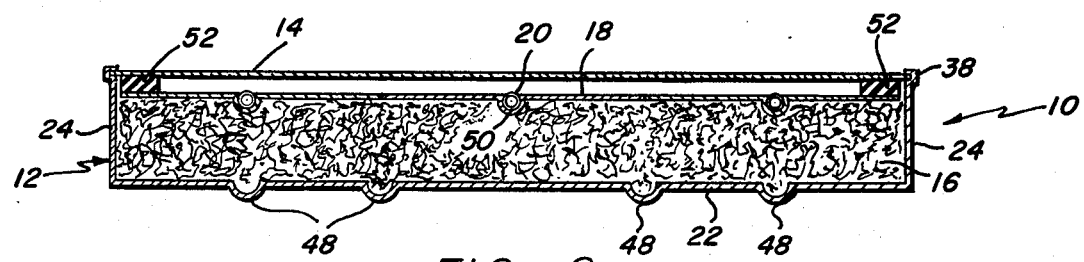

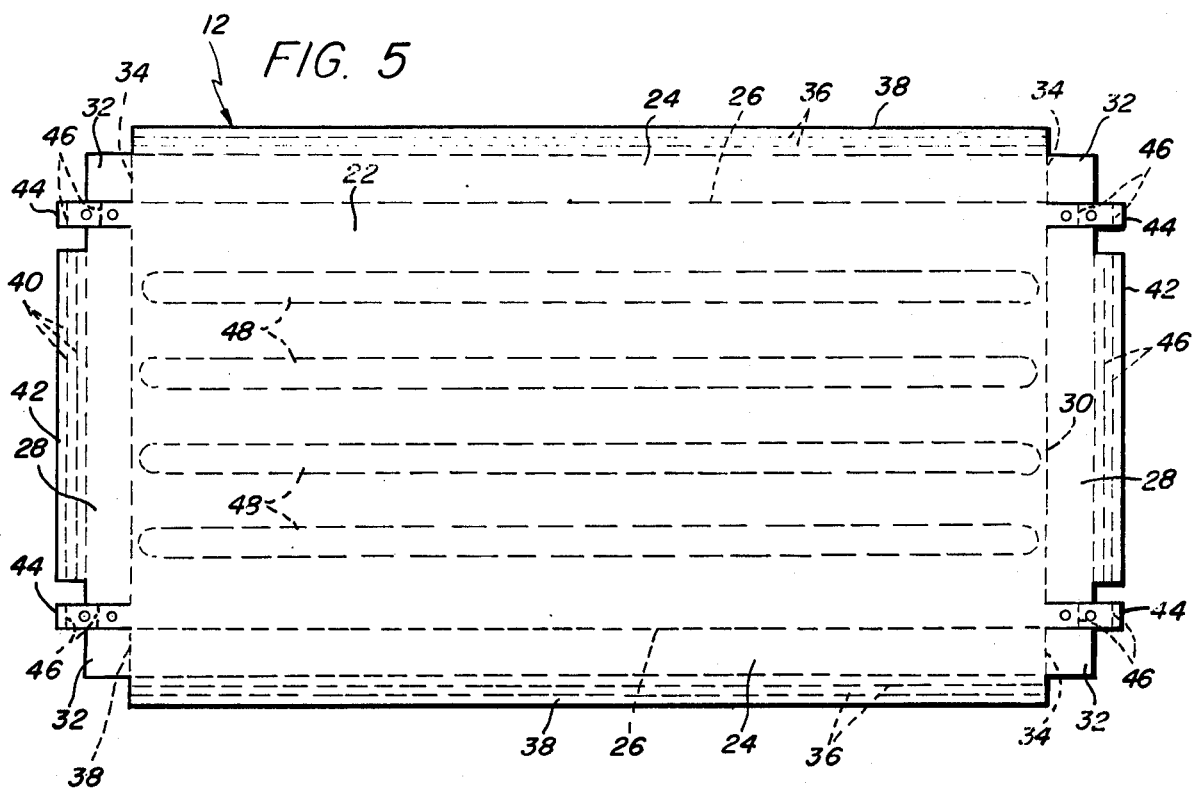
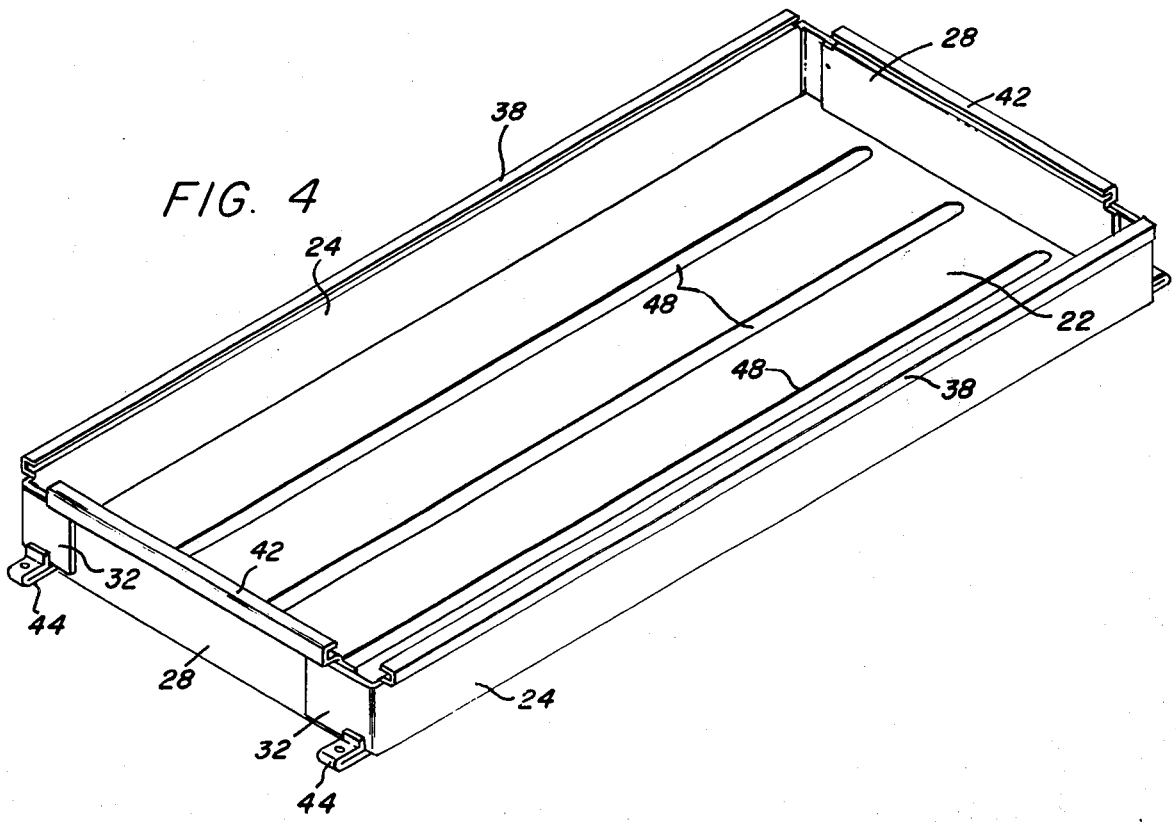

SOLAR ENERGY COLLECTORS

BACKGROUND OF THE INVENTION

In the manufacture of solar energy collectors of a type suitable to heat water or air for domestic or other use, the collectors are usually designed for mounting on a roof or adjacent a building within which is located a storage area within which the heated medium is stored.

Known collectors usually include a boxlike enclosure having separate bottom, side and end walls assembled into the desired configuration and having its upper side covered by glass or plastic glazing screwed, bolted or otherwise secured in place.

Such enclosures require careful fabrication and assembly by relatively expensive methods. The bottom of the enclosure may be of a size to extend over several square feet and, when made of relatively thin material may easily buckle and bend, making it difficult to handle the assembled collector and sometimes resulting in damage to the glazing.

Additional means is usually required to secure the collector to a roof, and when the collector is mounted in position upon the roof, no means is provided for ventilating the space between the roof and the bottom of the collector, thus resulting in possible damage to the roof.

SUMMARY OF THE INVENTION

The above and other objections to known solar energy collectors of this type are overcome in the present invention by the provision of a collector enclosure of sheet metal construction having a bottom, side walls and end walls formed from a single sheet of metal with integral lips on the side and end walls for retaining a glazing in position. The enclosure also is provided with integral ribs on its base or bottom for retaining the collector in spaced relation with the roof on which it is to be mounted, which ribs additionally provide structural rigidity for resisting undesired deformation of the collector.

Still further, the one-piece enclosure is also provided with integral tie-down brackets for fastening the collector to a roof or other support. Additionally, if desired the collector may be made in two or more longitudinally extending pieces which are connected together by integrally formed lock joints.

Such a structure enables solar energy collectors to be quickly manufactured in large quantites by simply sheet metal stamping and folding techniques, with the resultant collectors being low weight, durable and easily assembled into efficient, easily handled and relatively low cost structures.

BRIEF DESCRIPTION OF THE DRAWINGS

The above and other improvements will become apparent from the following description taken in connection with the accompanying drawings, wherein FIG. 1 is an elevational view of a solar energy collector embodying the invention;

FIG. 2 is an enlarged horizontal section view taken substantially on line 2—2 of FIG. 1;

FIG. 3 is an enlarged horizontal sectional view through one of the collector panels;

FIG. 4 is an isometric view of the collector enclosure;

FIG. 5 is a plan view of the metal sheet from which the enclosure is formed;

DESCRIPTION OF THE PREFERRED EMBODIMENT

Figure 6:
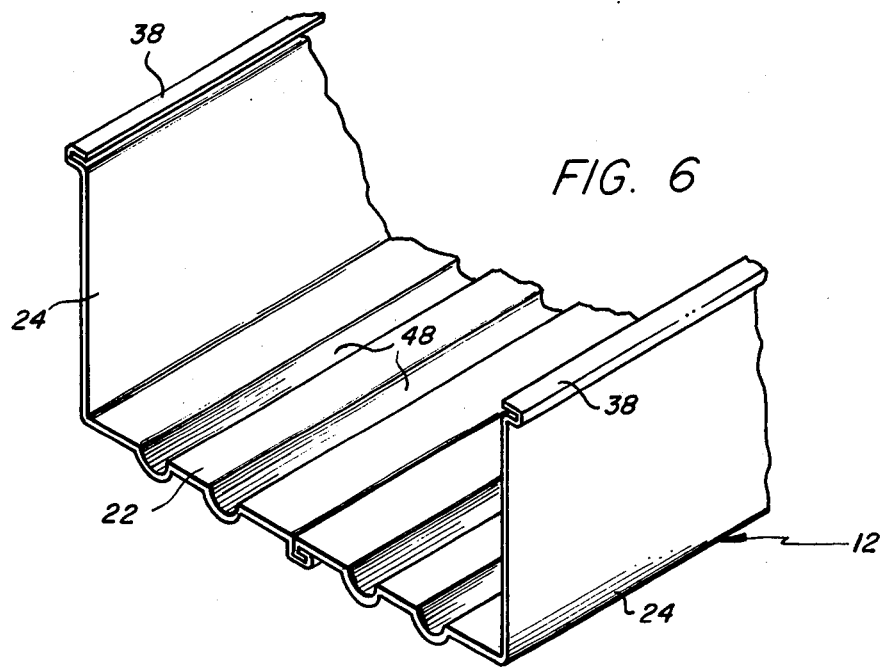
FIG. 6 is an enlarged fragmentary view of a mid-portion of the enclosure.
Figure 7:
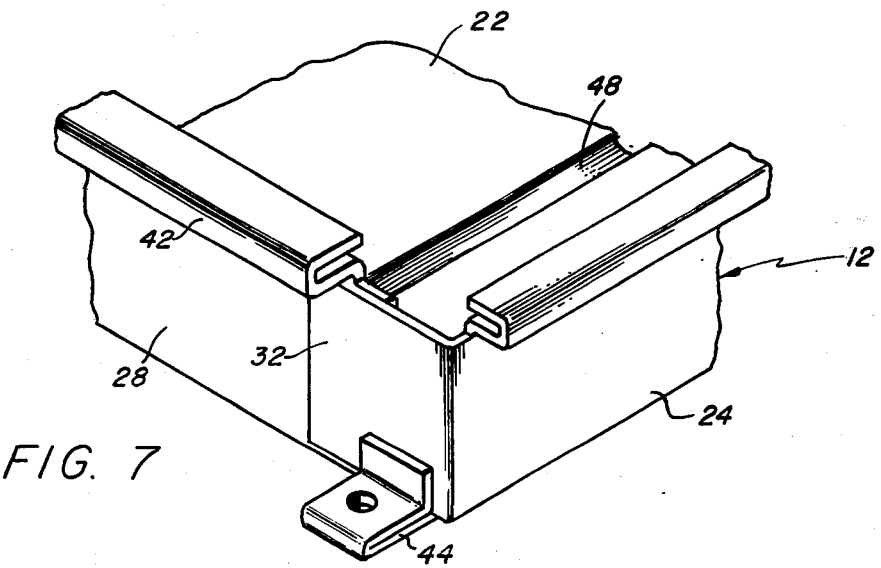
FIG. 7 is an enlarged fragmentary view of corner portion of the enclosure.

Referring more particularly to the drawings wherein like characters of reference designate like parts throughout the several views, the solar energy collector 10 shown in FIGS. 1 and 2 comprises a boxlike enclosure 12 having an open top covered by a glazing 14. Within the enclosure is a layer 16 of insulating material upon which rests a solar energy-absorbing panel 18 which is spaced slightly beneath the glazing. The panel 18 is in efficient heat-conductive relation to a grid or other arrangement of conduit or piping 20 through which is forced a fluid, such as water, to be heated by the heat from the panel 18.

The enclosure is preferably formed from a thin sheet of metal such as steel or aluminum, which may be procured in sheet form or in roll form and subsequently die stamped to the configuration shown in FIG. 5. The base portion 22 comprises the bottom of the enclosure and the longitudinally extending integral sides are formed by bending the portions 24 upwardly along lines 26 and perpendicular to the base 22. The enclosure's integral ends are formed by similarly bending the portions 28 upwardly along lines 30 and perpendicular to the base and to the sides 24.

Sides 24 have integral portions 32 extending from each end, which portions are folded along lines 34 so as to overlie the adjacent outer surfaces of the ends 28 to which they are affixed by spot welding or the like.

The upper edges of the sides 24 are folded along lines 36 to form integral channel members 38 which extend longitudinally of the enclosure to receive the sides of the glazing 14. The upper edges of the ends 28 are likewise folded along lines 40 to form similar integral end channel members 42 for receiving the ends of the glazing 14. Thus the glazing 14, which may be optically transparent glass or plastic, is firmly held in place in closing relation to the open top of the enclosure. If desired, two slightly spaced parallel glazing may be utilized.

Adjacent each extended side portion 32 of the metal sheet is a respective integral projection 44 which, when folded along line 46 and affixed as by spot welding to the adjacent folded portion 32, produces an integral bracket by which the collector may be secured in position of use on a roof or other support.

During the stamping operation the base 32 is provided with a number of recesses 48 which project downwardly from the bottom of the enclosure to form supports by which the enclosure is supported on the roof. Thus, there is provided a space between the enclosure base and the roof for the circulation of air and water, thus aiding in the prevention of rotting or other damage to the roof. The recesses 48, when made in elongated configuration as shown in FIG. 4 also provide increased structural rigidity and strength in the enclosure.

The energy-absorbing panel 18 may be of any suitable and convenient construction. For example, it may comprise a single sheet of metal or, as shown in FIGS. 1 and 2, it may comprise several elongated parallel strips placed in edge-to-edge relation in substantially a common plane. The panel should, of course, be provided with a blackened surface or otherwise treated to provide efficient solar energy absorption.

The piping 20 is of metal such as copper which is located in good heat conductive relation to the panels 18 such as by being disposed within resilient grooves 50 as shown in FIG. 3, the sides of the grooves snugly encompassing a substantial circumferential portion of the piping so that heat may be efficiently transmitted from the panels to the piping and, consequently, to a fluid within the piping. The piping 20 is adapted to be connected at one end to a source of fluid (not shown) and at its other end to a suitable storage tank or area (not shown) in the known manner of systems of this character.

In the operation of a solar collector as described, solar energy will pass through the glazing 14 to the panel 18 which will consequently become heated. The panel 18 rests upon the insulation 16 which may be loose fibrous material or a solid material. It is, of course, important that a small space of suitable size, such as one-half to one inch, for example, be maintained between the panel and glazing to aid in retaining heat which radiates from the panel. Therefore, suitable heat resistant space members 52 of low heat conductivity are disposed between the panel and glazing for this purpose. Other means may be employed for holding the panel in spaced relation to the glazing such as fine tie wires (not shown) which extend through the insulation from the panel to the base 22. It is highly desirable of course, to space the outer edge of the panel from the walls of the enclosure 12 to prevent conduction of heat from the panel into the walls.

From the foregoing it will be apparent that all of the objectives and advantages of this invention are achieved in the solar collector shown and described. It will also be apparent, however, that various modifications and changes may be made in the structures shown and described without departing from the spirit of the invention as expressed in the accompanying claims. Therefore, all matter shown and described is to be interpreted as illustrative and not in a limiting sense.

What is claimed is:

1. A solar energy collector comprising a rigid sheet-metal boxlike enclosure including a base and integral upstanding side and end walls, the upper edges of said walls having integral portions folded upon one another in spaced relation to provide a channel in their inner sides, a solar radiation transparent glazing mounted over the top of the enclosure with its peripheral edges supported within said channels, a layer of heat insulating material within the enclosure, and a solar radiation absorbing panel within the enclosure and disposed between the insulating layers and the glazing in spaced relation with the glazing, said base of the enclosure having outwardly directed elongated recesses therein and having integral mounting brackets projecting outwardly therefrom.

2. A solar energy collector as set forth in claim 1 wherein means is provided for retaining the panel upon the insulating layer in spaced relation with the glazing to provide a space therebetween.

3. A solar energy collector as set forth in claim 1 wherein said panel is metal and is positioned with its peripheral edges in thermally nonconductive relation with the walls of the enclosure.

* * * * *